S. K. DENNIS.
CORN PLANTER.
APPLICATION FILED MAY 10, 1911.
1,000,672.  Patented Aug. 15, 1911.
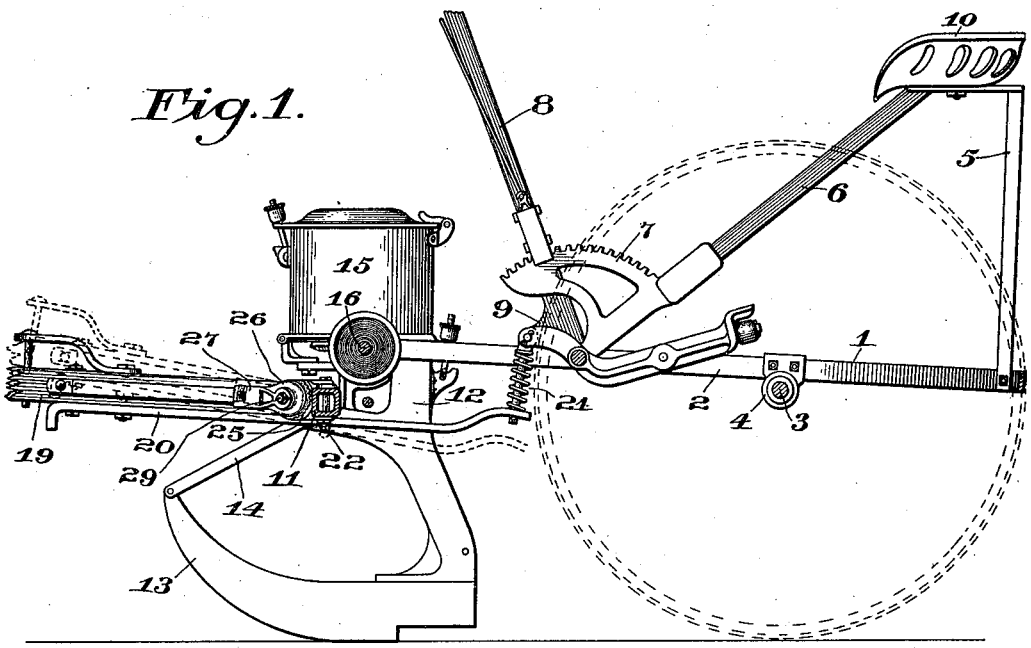
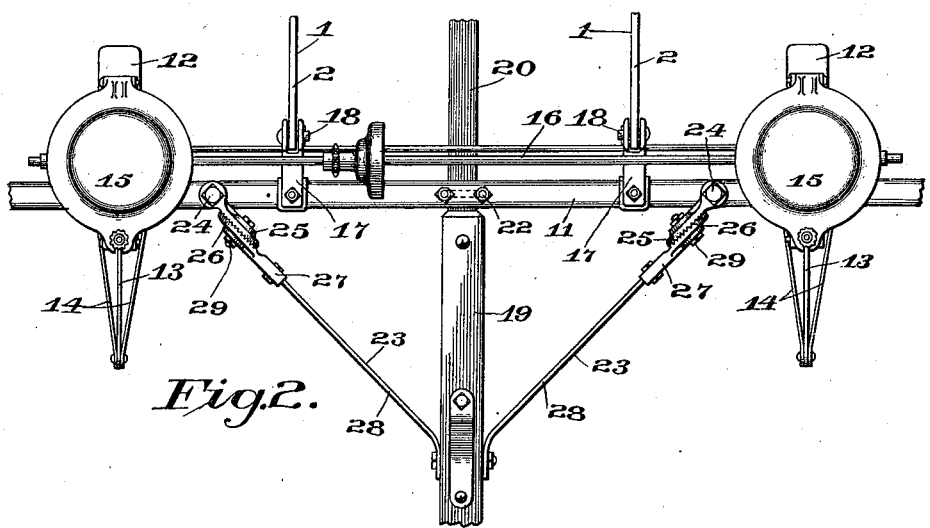
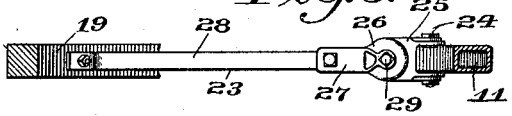
Witnesses:
C. C. Palmer.
F. W. Hoffmeister.
Inventor.
Samuel K. Dennis.
By O. W. Burgess
Attorney.
COLUMBIA PLANOGRAPH CO., WASHINGTON, D. C.

UNITED STATES PATENT OFFICE.

SAMUEL K. DENNIS, OF CHICAGO, ILLINOIS, ASSIGNOR TO INTERNATIONAL HARVESTER COMPANY, A CORPORATION OF NEW JERSEY.

CORN-PLANTER.

1,000,672.    Specification of Letters Patent.   Patented Aug. 15, 1911.

Application filed May 10, 1911. Serial No. 626,261.

*To all whom it may concern:*

Be it known that I, SAMUEL K. DENNIS, a citizen of the United States, residing at Chicago, in the county of Cook and State of Illinois, have invented certain new and useful Improvements in Corn - Planters, of which the following is a specification.

My invention relates to corn planters, and in particular to means whereby the angle of the draft tongue relative to the runner frame may be regulated for the purpose of controlling the position of the seed conduit to insure accurate planting, and it consists in providing sectional tongue brace members comprising interlocking plates that may be adjusted axially in a manner to vary the angle of one section relative to the other; the objects of my invention being to provide a mechanism that may be readily manipulated for the purpose required, rigid when adjusted and efficient in operation. I attain these objects by means of the mechanism illustrated by the accompanying drawing, in which—

Figure 1 represents a side elevation of part of a corn planter including a runner frame and designed to illustrate the manner of connecting a draft tongue therewith; Fig. 2 is a top plan view of part of Fig. 1;
and Fig. 3 represents a detached detail designed to illustrate the construction of a two-part sectional tongue brace.

The same reference characters designate like parts throughout the several views.

1 represents the wheel frame of a corn planter, including side frame members 2; 3 an axle journaled in bearings 4 secured to said side frame members; 5 a seat supporting frame having its lower end secured to the rear end of the wheel frame; 6 the downwardly and forwardly inclined seat supporting member having a toothed sector 7 secured to its forward end; 8 a hand lever pivotally mounted upon the wheel frame and including a forwardly extending arm 9, and 10 represents the seat.

11 represents a transversely arranged runner frame member having seed conduits 12 secured to opposite ends thereof; 13 the furrow row opening runners having their rear ends secured to the lower ends of the seed conduits and their forward upturned ends connected with the upper ends of the seed conduits by means of brace members 14; 15 the seed hoppers carried by the upper ends of the seed conduits, and 16 a seed shaft journaled thereon.

17 represents draft brackets secured to the runner frame member 11 and having their rear upturned ends pivotally connected with the front ends of the side members of the wheel frame by means of pins 18.

19 represents a draft tongue; 20 a bar secured to the lower side of the tongue and extending in rear thereof has its rear end connected with the arm 9 of the hand lever by means of a common form of pressure spring mechanism 21, and its middle portion secured to the runner frame member 11 by means of a U-bolt 22.

23 represents tongue brace members having their rear ends in the form of a clevis that receives the runner frame member 11 between its members, as shown in detail in Fig. 3, and are secured thereto upon opposite sides of the draft tongue by means of bolts 24, the forward ends thereof being provided with circular plate members 25 arranged in vertical planes and provided with radial corrugations that are adapted to interlock with corresponding corrugations upon the adjacent surfaces of circular plate members 26 that are provided with forwardly projecting arms 27 to which are secured forwardly converging bars 28, the front ends of said bars being secured to the draft tongue, and the plates are secured together by means of axial bolts 29.

When it is desired to adjust the angle of the draft tongue relative to the runner frame, the operator first loosens the nuts upon the U-bolt 22 and also those upon the axial bolts 29, when the interlocking members of the sectional tongue brace may be turned about their axes in a manner to vary their angular relation, and through them that of the draft tongue to the runner frame.

What I claim as my invention, and desire to secure by Letters Patent, is:

1. A corn planter including, in combination, a wheel frame, a runner frame pivotally connected with the forward end of said wheel frame, said runner frame including a transversely arranged frame member and furrow opening runners secured thereto, a draft tongue having its rear end adjustably secured to said transverse runner frame member, draft tongue brace members having their forward ends secured to said tongue and their rear ends provided with interlocking plate members connecting said braces with said transverse runner frame member, and means for adjusting the angular relation of said interlocking plate members in a manner to vary the angle of said tongue relative to said runner frame.

2. A corn planter including, in combination, a wheel frame, a runner frame pivotally connected with the forward end of said wheel frame, said runner frame including a transversely arranged frame member and furrow opening runners secured thereto, a draft tongue having its rear end adjustably secured to said transverse runner frame member by means of a U-bolt, draft tongue brace members having their forward ends secured to said draft tongue and their rear ends secured to circular plate members having radially corrugated surfaces arranged in vertical planes, interlocking complemental plate members secured to said circular plates by means of axial bolts whereby the angular relation of said plate members may be varied, and means for securing said complemental plates to said transverse runner frame member.

SAMUEL K. DENNIS.

Witnesses:
 EVAN EVANS,
 HERBERT DEKKER.

Copies of this patent may be obtained for five cents each, by addressing the "Commissioner of Patents, Washington, D. C."